(12) United States Patent
Nagashima et al.

(10) Patent No.: US 6,999,842 B2
(45) Date of Patent: Feb. 14, 2006

(54) NUMERICAL CONTROLLER

(75) Inventors: Noritake Nagashima, Yamanashi (JP); Hiroyuki Yonekura, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/745,558

(22) Filed: Dec. 29, 2003

(65) Prior Publication Data
US 2004/0138774 A1 Jul. 15, 2004

(30) Foreign Application Priority Data
Dec. 26, 2002 (JP) .............................. 2002-376030

(51) Int. Cl.
*G06F 19/00* (2006.01)
(52) U.S. Cl. ...................... 700/181; 700/18; 700/169; 318/569
(58) Field of Classification Search ................ 700/169, 700/181, 18; 318/569
See application file for complete search history.

(56) References Cited

U.S. PATENT DOCUMENTS

| | | | | |
|---|---|---|---|---|
| 4,692,872 A | * | 9/1987 | Kiya ........................... | 700/181 |
| 5,986,425 A | | 11/1999 | Onishi et al. | |
| 6,757,568 B2 | * | 6/2004 | Birzer et al. ................... | 700/18 |

FOREIGN PATENT DOCUMENTS

| | | |
|---|---|---|
| DE | 40 08 559 A1 | 9/1991 |
| EP | 0 308 510 A1 | 3/1989 |
| EP | 0 553 621 A1 | 8/1993 |
| EP | 1 231 527 A2 | 8/2002 |
| JP | 10-3307 | 1/1998 |
| JP | 2002-62913 | 2/2002 |

OTHER PUBLICATIONS

Japanese Patent Office Notice of Grounds for Rejection (Office Action) dated May 10, 2005.

* cited by examiner

*Primary Examiner*—Leo Picard
*Assistant Examiner*—Sheela Rao
(74) *Attorney, Agent, or Firm*—Staas & Halsey LLP

(57) ABSTRACT

A numerical controller which allows easy and inexpensive construction or expansion of a control system and flexible construction of a sequential control section for a variety of system structures. The numerical controller has a numerical control section having multiple control systems. Between the numerical control section and a sequential control section, interfaces are provided for the individual control systems of the numerical control section. The control systems are assigned to the interfaces so that the control systems will be each controlled by an intended one of sequence programs (ladders 1 through 3) installed in the sequential control section, under which signals are sent and received independently. The numerical control section and the sequential control section send and receive signals through the interfaces to which the control systems are assigned. By changing the assignment, the control system can be reconstructed freely, without adding a new programmable controller.

5 Claims, 5 Drawing Sheets

FIG. 3

| PARAMETER VALUE | MEANING |
|---|---|
| 100 | ASSIGN TO F0~F767 & G0~G767 FOR SEQUENCE PROGRAM 1 |
| 101 | ASSIGN TO F1000~F1767 & G1000~G1767 FOR SEQUENCE PROGRAM 1 |
| 102 | ASSIGN TO F2000~F2767 & G2000~G2767 FOR SEQUENCE PROGRAM 1 |
| 103 | ASSIGN TO F3000~F3767 & G3000~G3767 FOR SEQUENCE PROGRAM 1 |
| 104 | ASSIGN TO F4000~F4767 & G4000~G4767 FOR SEQUENCE PROGRAM 1 |
| 200 | ASSIGN TO F0~F767 & G0~G767 FOR SEQUENCE PROGRAM 2 |
| 201 | ASSIGN TO F1000~F1767 & G1000~G1767 FOR SEQUENCE PROGRAM 2 |
| 202 | ASSIGN TO F2000~F2767 & G2000~G2767 FOR SEQUENCE PROGRAM 2 |
| 203 | ASSIGN TO F3000~F3767 & G3000~G3767 FOR SEQUENCE PROGRAM 2 |
| 204 | ASSIGN TO F4000~F4767 & G4000~G4767 FOR SEQUENCE PROGRAM 2 |
| 300 | ASSIGN TO F0~F767 & G0~G767 FOR SEQUENCE PROGRAM 3 |
| 301 | ASSIGN TO F1000~F1767 & G1000~G1767 FOR SEQUENCE PROGRAM 3 |
| 302 | ASSIGN TO F2000~F2767 & G2000~G2767 FOR SEQUENCE PROGRAM 3 |
| 303 | ASSIGN TO F3000~F3767 & G3000~G3767 FOR SEQUENCE PROGRAM 3 |
| 304 | ASSIGN TO F4000~F4767 & G4000~G4767 FOR SEQUENCE PROGRAM 3 |

FIG. 4

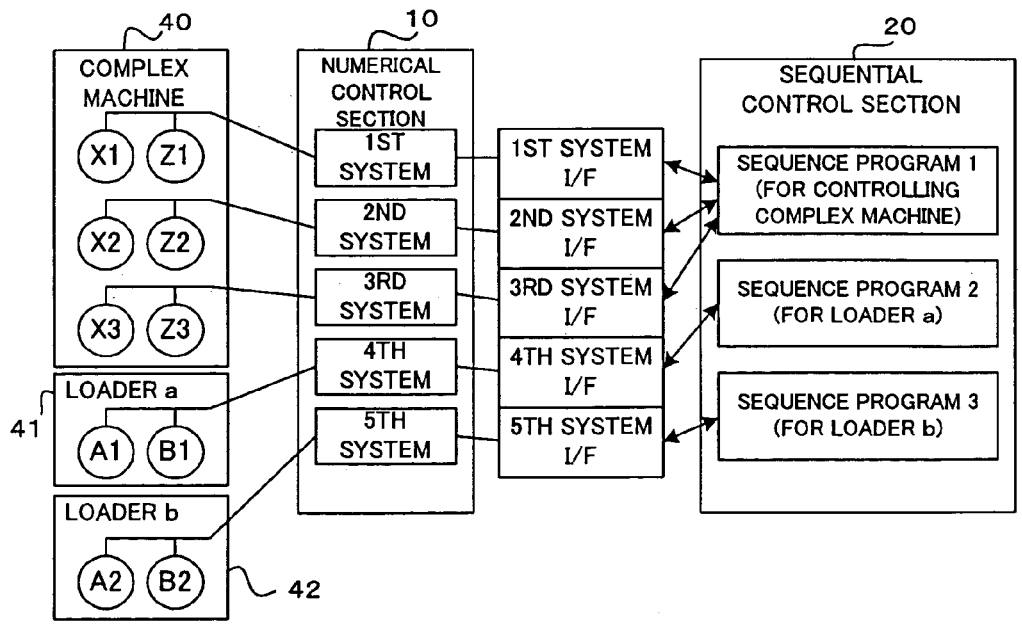

FIG. 5

| PARAMETER NUMBER | DESCRIPTION | PARAMETER VALUE |
|---|---|---|
| 5100 | SEQUENCE PROGRAM & AREAS OF SIGNAL TABLES F, G TO BE ASSIGNED FOR 1ST SYSTEM I/F | 100 |
| 5101 | SEQUENCE PROGRAM & AREAS OF SIGNAL TABLES F, G TO BE ASSIGNED FOR 2ND SYSTEM I/F | 101 |
| 5102 | SEQUENCE PROGRAM & AREAS OF SIGNAL TABLES F, G TO BE ASSIGNED FOR 3RD SYSTEM I/F | 102 |
| 5103 | SEQUENCE PROGRAM & AREAS OF SIGNAL TABLES F, G TO BE ASSIGNED FOR 4TH SYSTEM I/F | 200 |
| 5104 | SEQUENCE PROGRAM & AREAS OF SIGNAL TABLES F, G TO BE ASSIGNED FOR 5TH SYSTEM I/F | 300 |

FIG. 6

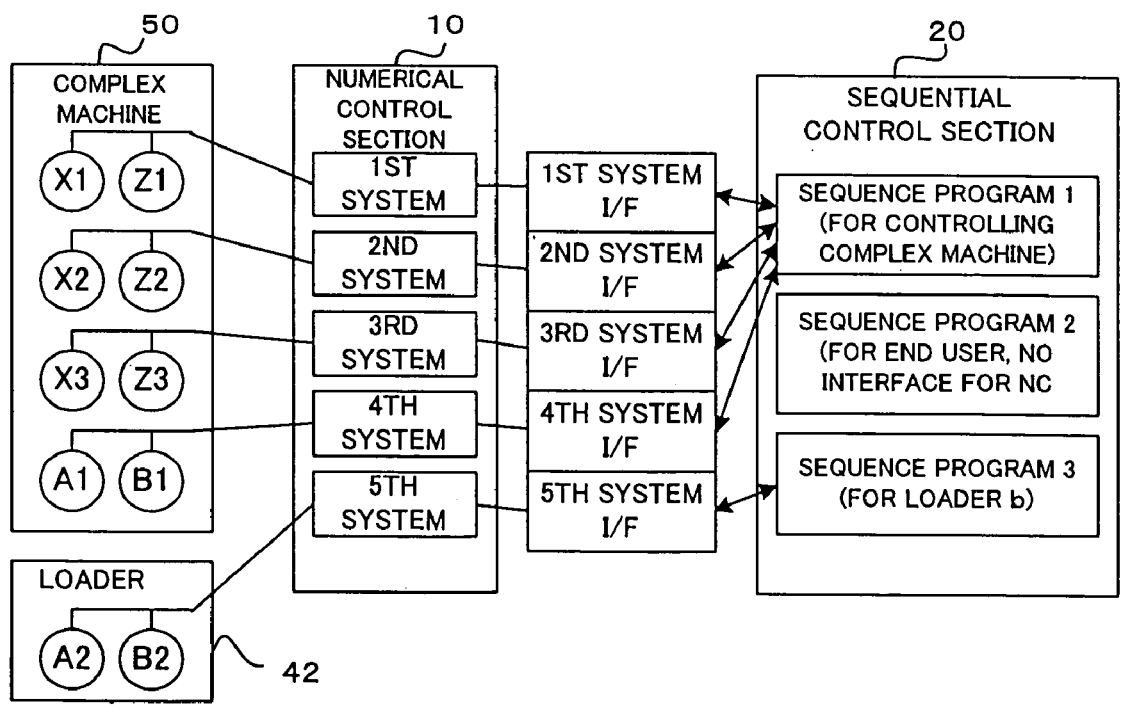

FIG. 7

| PARAMETER NUMBER | DESCRIPTION | PARAMETER VALUE |
|---|---|---|
| 5100 | SEQUENCE PROGRAM & AREAS OF SIGNAL TABLES F, G TO BE ASSIGNED FOR 1ST SYSTEM I/F | 100 |
| 5101 | SEQUENCE PROGRAM & AREAS OF SIGNAL TABLES F, G TO BE ASSIGNED FOR 2ND SYSTEM I/F | 101 |
| 5102 | SEQUENCE PROGRAM & AREAS OF SIGNAL TABLES F, G TO BE ASSIGNED FOR 3RD SYSTEM I/F | 102 |
| 5103 | SEQUENCE PROGRAM & AREAS OF SIGNAL TABLES F, G TO BE ASSIGNED FOR 4TH SYSTEM I/F | 103 |
| 5104 | SEQUENCE PROGRAM & AREAS OF SIGNAL TABLES F, G TO BE ASSIGNED FOR 5TH SYSTEM I/F | 300 |

FIG. 8

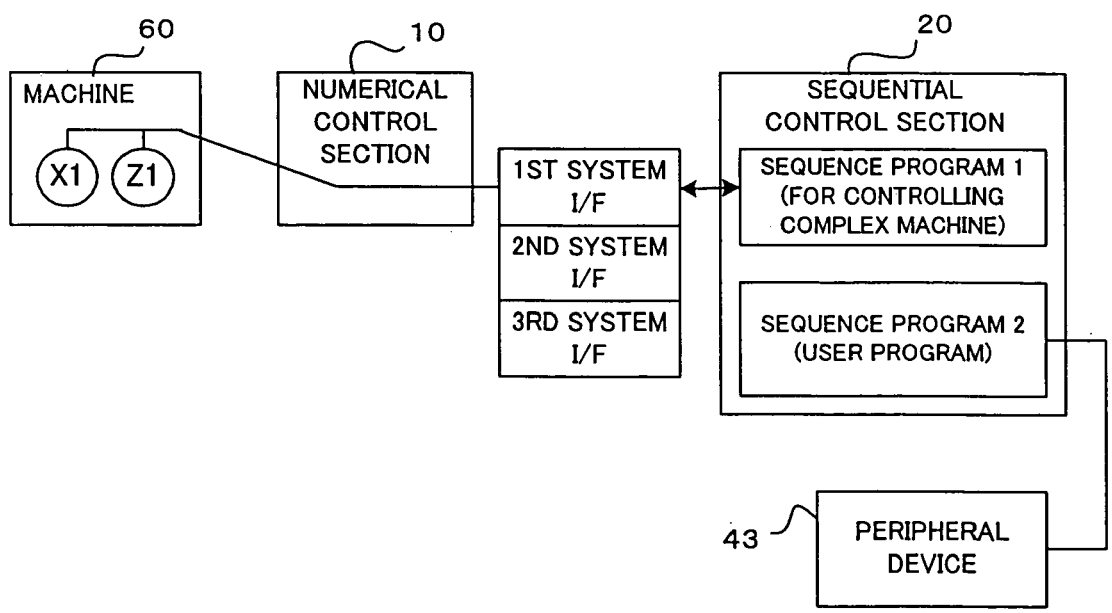

NUMERICAL CONTROLLER

BACKGROUND OF THE INVENTION

1. Field of the Invention

The present invention relates to a numerical controller having a multiple-system numerical control section for controlling multiple systems of operation and a multiple-system sequential control section.

2. Description of Related Art

In the conventional numerical controller having a multiple-system numerical control section, sequence control is performed by a single-system sequential control section. When a peripheral device such as a workpiece loader or a pallet changer should be attached to a machine tool using the numerical controller of this type, a programmable logic controller (PLC) for sequence-controlling the peripheral device is added to control it.

There is known a numerical controller in which a CNC circuit is provided in a CNC board and a sequence control circuit is provided in the numerical controller itself so that a machine tool or the like is numerically-controlled by the CNC circuit and sequence-controlled by the sequence control circuit receiving miscellaneous function signals (M-function, T-function and the like) from the CNC circuit and/or a signal from a machine. In the numerical controller of this type, when a peripheral device should be added to a system without adding another PLC, another programmable control board (PC board) is added to the numerical controller to sequence-control the peripheral device. In this case, the CNC circuit and the sequence control circuit are originally interfaced. By interfacing the sequence control circuit provided in the numerical controller and the added PC board, all necessary parts of the system including the CNC circuit are interfaced each other (see JP 10-3307A).

Upgrading a system by adding a new peripheral device or the like to a numerical controller is increasing to meet a demand for automation at a plant or the like. However, in the conventional method, each time a new peripheral device is added to an existing numerical control system to upgrade it, a programmable logic controller (PLC) or a PC board needs to be added. This makes the structure of the system complicated and increases cost.

SUMMARY OF THE INVENTION

The invention provides a numerical controller which allows easy and inexpensive construction or expansion of a control system and flexible construction of a sequential control section for a variety of system structures.

A numerical controller of the present invention comprises: a numerical control section for numerically-controlling one or more systems; a sequential control section for executing a plurality of sequence programs to independently input and output control signals for the systems of said numerical control section; interfaces respectively provided for the control systems of said numerical control section to communicate said numerical control section and said sequential control section; and assigning means for assigning the systems to be controlled according to the sequence programs of said sequential control section to said interfaces. The numerical control section and the sequential control section perform sending and receiving of the control signals though said interfaces in accordance with the assigned systems.

Information on the assignment of the systems to be controlled according to the sequence programs of said sequential control section may be stored in nonvolatile storage means provided in said numerical control section. The sequential control section may control a device not controlled by said numerical control section according to a sequence program to which none of the systems is assigned.

BRIEF DESCRIPTION OF THE DRAWINGS

FIG. 3 is a table showing the meanings of parameter values assigned to parameters in the embodiment, FIG. 4 is a block diagram showing an example of a control system constructed according to the embodiment, FIG. 5 is a table showing how to assign parameter values to parameter numbers to construct the example of the control system, FIG. 6 is a block diagram showing an example of the control system changed according to the embodiment, FIG. 7 is a table showing how to assign parameter values to parameter numbers when the control system is changed, and FIG. 8 is a block diagram showing an example in which an independent device is controlled by a sequential control section in the embodiment.

DETAILED DESCRIPTION

Figure 1A:
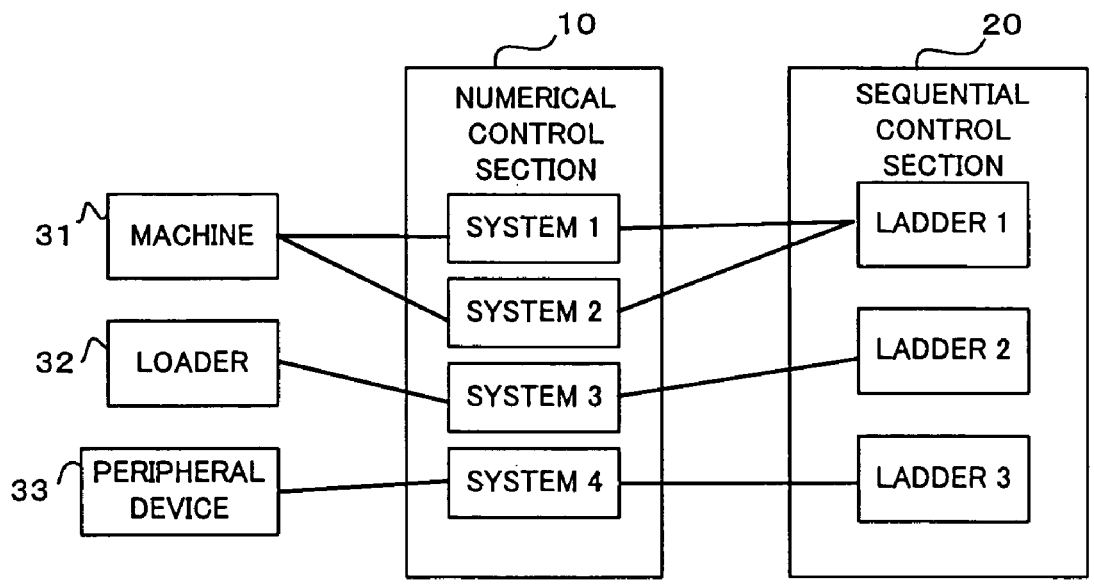
FIGS. 1a and 1b are diagrams for giving an outline of the invention.

In FIG. 1a, a numerical control section 10 is so arranged that two control systems 1, 2 numerically-control two operation systems of a machine 31, a control system 3 numerically-controls a workpiece loader 32, and a control system 4 numerically-controls a peripheral device 33. A sequential control section (i.e., a programmable machine controller (PMC)) 20 has a plurality of sequence programs (ladders) under which signals re sent and received independently. The sequential control section (PMC) 20 executes the sequence programs in parallel. Between the sequential control section 20 and the numerical control section 10, independent interfaces are provided for the individual control systems of the numerical control section 10. In the example of FIG. 1a, the interfaces for the control systems 1 and 2 of the numerical control section 10 are assigned to a ladder (sequence program) 1, the interface for the control system 3 to a ladder 2, and the interface for the control system 4 to a ladder 3.

Figure 1B:
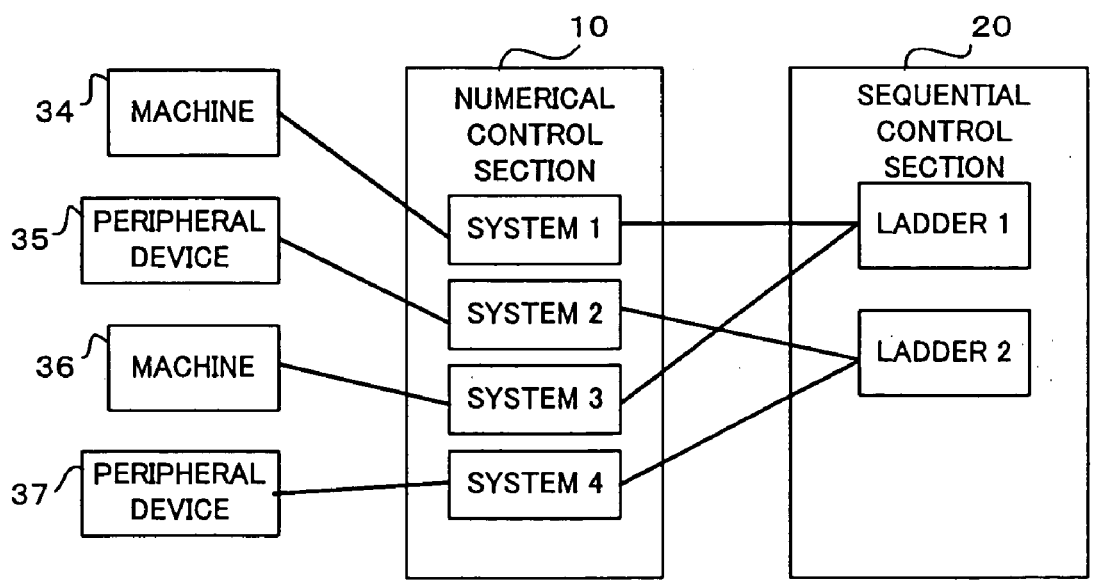

In FIG. 1b, the system is so changed that the control system 1 of the numerical control section 10 numerically-controls a machine 34, the control system 2 a peripheral device 35, the control system 3 a machine 36, and the control system 4 a peripheral device 37. Here, the interfaces for the control systems 1 and 3 are assigned to the ladder 1 of the sequential control section (PMC) 20, and the interfaces for the control systems 2 and 4 to the ladder 2.

Like this, in the present invention, the sequence programs in the sequential control section (PMC) 20 can be assigned to the control systems of the numerical control section 10, freely, i.e., selectively.

Figure 2:
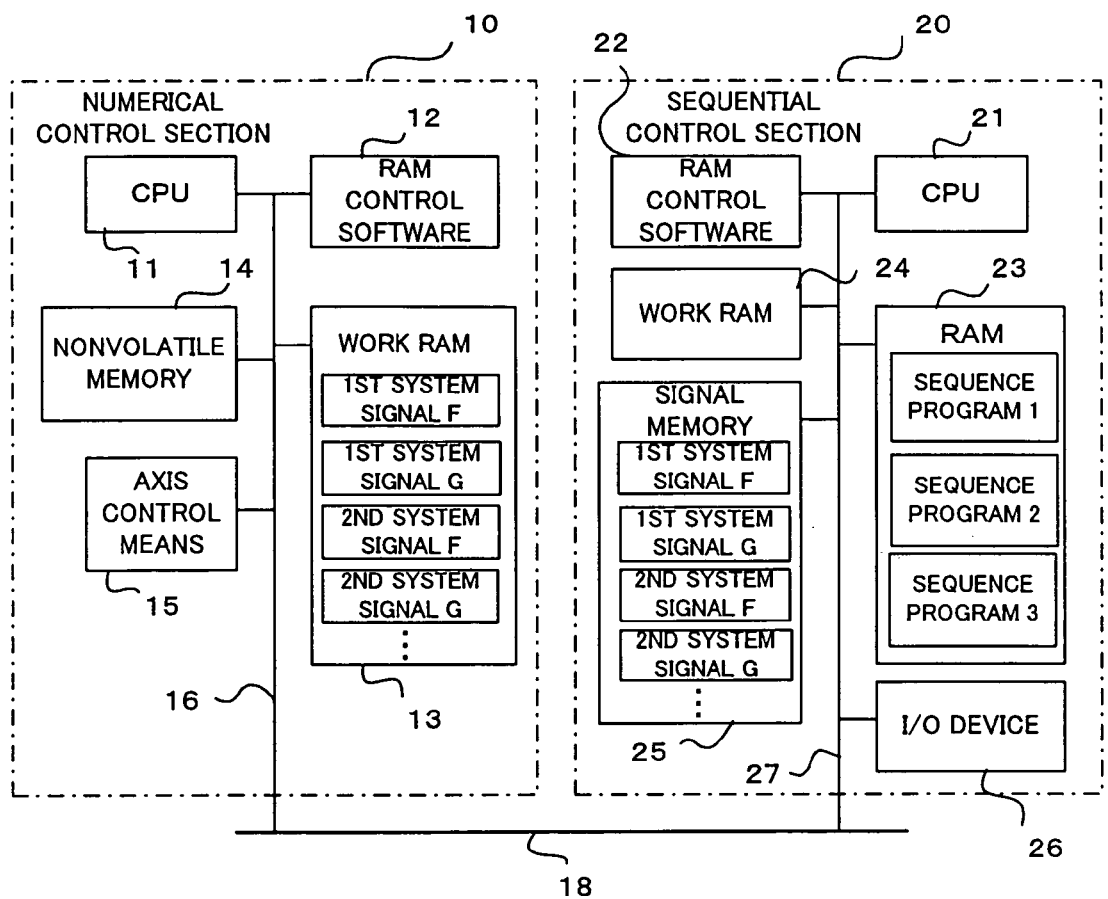
FIG. 2 is a block diagram showing relevant parts of an embodiment of the invention.

FIG. 2 is a block diagram showing relevant parts of a numerical controller according to an embodiment of the invention. To a processor 11 of a numerical control section 10 of the numerical controller, a RAM 12 for storing control software for controlling the numerical control section, a work RAM 13, a nonvolatile memory formed of RAM, and a shaft control means 15 for controlling servomotors for driving shafts of a to-be-controlled machine are connected by means of a bus 16. The work RAM 13 has signal tables F for storing signals sent out to the sequential control section (PMC) 20 and signal tables G for storing signals sent from the sequential control section (PMC) 20 to the numerical control section. The signal tables F and signal table G are provided for individual control systems of the numerical control section, and form the interfaces between the individual control systems of the numerical control section and the sequential control section (PMC) 20.

To a processor 21 of the sequential control section 20, a RAM 22 for storing control software for controlling the sequential control section, a RAM 23 for storing various sequence programs, a work RAM 24, a signal memory (RAM) 25, and an input/output device 26 for connection to a machine or a peripheral device are connected by means of a bus 27. The signal memory (RAM) 25 has signal tables F for storing signals sent from the numerical control section to the sequential control section and signal tables G for storing signals sent from the sequential control section to the numerical control section. The signal tables F and signal tables G are provided for individual control systems of the sequential control section, and form the interfaces between the individual control systems of the sequential control section and the numerical control section 10. The bus 16 and the bus 27 are connected by a bus 18.

The numerical control section 10 and the sequential control section 20 are interfaced by periodically transferring and updating the signal tables F, G for the individual control systems of the numerical control section 10 provided in the work RAM 13 thereof and the signal tables F, G for the individual control systems of the sequential control section 10 provided in the signal memory thereof. Specifically, the data stored in signal tables F of the numerical control section 10 provided for storing signals sent from the numerical control section to the sequential control section is periodically written in the signal tables F of the sequential control section 20, while the data stored in signal tables G of the sequential control section 20 provided for storing signals sent from the sequential control section to the numerical control section is periodically written in the signal tables G of the numerical control section 10.

The above-described structure of the numerical controller is the same as that of the conventional numerical controller, except that the signal tables F and signal tables G are provided for the individual control systems.

In the present embodiment, parameter values used for assigning the signal tables provided for the individual control systems of the numerical control section to the sequence programs are stored in the nonvolatile memory 14 of the numerical control section 10. FIG. 3 shows an example of parameter values. In this example, parameter value "100" means that a signal table for a control system of the numerical control section should be assigned to address F0~F767 of the signal table F for the sequence program 1 and address G0~G767 of the signal table G for the sequence program 1. Parameter value "101" means that a signal table for a control system of the numerical control section should be assigned to address F1000~F1767 of the signal table F for the sequence program 1 and address G1000~G1767 of the signal table G for the sequence program 1. Parameter value "200" means that a signal table for a control system of the numerical control section should be assigned to address F0~F767 of the signal table F for the sequence program 2 and address G0~G767 of the signal table G for the sequence program 2. Parameter value "300" means that a signal table for a control system of the numerical control section should be assigned to address F0~F767 of the signal table F for the sequence program 3 and address G0~G767 of the signal table G for the sequence program 3. Like this, each parameter value is connected with a combination of a sequence program number and an address of a block of a signal table F and an address of a block of a signal table G, as shown in FIG. 3. The parameter values may be stored in a manner other than the above-described manner. They may be stored in another nonvolatile memory or a volatile memory (not shown) provided in the numerical controller.

First, the case in which a control system shown in FIG. 4 should be constructed will be described. In the example of control system shown in FIG. 4, the numerical controller controls a complex machine 40 having three systems of operation, and two workpiece loaders 41 and 42 for supplying workpieces to the machine 40. The first, second and third control systems of the numerical control section 10 controls the first (x1, z1), second (x2, z2), and third (x3, z3) operation systems of the complex machine 40, respectively. The fourth and fifth control systems of the numerical control section 10 controls the loaders 41 and 42, respectively.

Here, as shown in FIG. 5, parameter value "100" is assigned to parameter number "5100" and stored in the nonvolatile memory 14. Parameter value "101" is assigned to parameter number "5101", parameter value "102" to parameter number "5102", parameter value "200" to parameter number "5103", and parameter value "300" to parameter number "5104", and they are stored in the nonvolatile memory 14.

Parameter number "5100" represents the first control system, "5101" the second, "5102" the third, "5103" the fourth, "5104" the fifth, "5105" the sixth, and so on. In the example of parameter setting shown in FIG. 5, parameter value "100" is assigned to parameter number 5100 which represents the first control system. Hence, address F0~F767 of the signal table F for the sequence program 1 and address G0~G767 of the signal table G for the sequence program 1 are assigned to the first control system of the numerical control section 10. Likewise, address F1000~F1767 of the same signal table F and address G1000~G1767 of the same signal table G are assigned to the second control system, and address F2000~F2767 of the same signal table F and address G2000~G2767 of the same signal table G to the third control system. Further, since parameter value "200" is assigned to parameter number 5103, address F0~F767 of the signal table F for the sequence program 2 and address G0~G767 of the signal table G for the sequence program 2 are assigned to the fourth control system. Furthermore, since parameter value "300" is assigned to parameter number 5104, address F0~F767 of the signal table F for the sequence program 3 and address G0~G767 of the signal table G for the sequence program 3 are assigned to the fifth control system.

Thus, for controlling the operation system 1 of the complex machine 40, signals are sent and received between the numerical control section 10 and the sequential control section 20 using address F0~F767 of the signal table F for the sequence program 1 and address G0~G767 of the signal table G for the sequence program 1. For controlling the operation system 2 of the complex machine 40, signals are sent and received using address F1000~F1767 of the signal table F for the sequence program 1 and address G1000~G1767 of the signal table G for the sequence program 1. Likewise, for controlling the operation system 3 of the complex machine 40, signals are sent and received using address F2000~F2767 of the same signal table F and address G2000~G2767 of the same signal table G. For controlling the loader a 41, signals are sent and received using address F0~F767 of the signal table F for the sequence program 2 and address G0~G767 of the signal table G for the sequence program 2. For controlling the loader b 42, signals are sent and received using address F0~F767 of the signal table F for the sequence program 3 and address G0~G767 of the signal table G for the sequence program 3.

Next, suppose that the existing system is changed or a new system is constructed so that the numerical controller will control a complex machine 50 having four systems of operation and a loader 42 as shown in FIG. 6. When the control systems 1 to 5 of the numerical control section 10 are connected with the machine 50 and the loader 42 as shown in FIG. 6, parameter setting for interfacing the numerical control section 10 and the sequential control section 20 as shown in FIG. 7 is stored in the nonvolatile memory 14.

Specifically, parameter value "100" is assigned to parameter number "5100", parameter value "101" to parameter number "5101", parameter value "102" to parameter number "5102", and parameter value "103" to parameter number "5103". Hence, address F0~F767 of the signal table F for the sequence program 1 and address G0~G767 of the signal table G for the sequence program 1 are assigned to the first operation system of the complex machine 50, address F1000~F1767 of the same signal table F and address G1000~G1767 of the same signal table G to the second operation system of the complex machine 50, address F2000~F2767 of the same signal table F and address G2000~G2767 of the same signal table G to the third operation system of the complex machine 50, and address F3000~F3767 of the same signal table F and address G3000~G3767 of the same signal table G to the fourth operation system of the complex machine 50. Further, since parameter value "300" is assigned to parameter number "5104", address F0~F767 of the signal table F for the sequence program 3 and address G0~G767 of the signal table G for the sequence program 3 are assigned to the loader 42.

Thus, the numerical control section 10 and the sequential control section 20 can be interfaced in a desired manner, by assigning or changing the parameter values. Thus, the system can be changed or expanded very easily. Since there is no need to add a new programmable controller or the like, the system can be changed at a low cost.

It can be so arranged that the sequential control section of the numerical controller controls a device which is not controlled by the numerical control section.

FIG. 8 is a block diagram of an example of this arrangement. Here, a machine 60 controlled by the numerical controller has a single system of operation. Only one interface of signal system is provided between the numerical control section 10 and the sequential control section 20 by setting parameters. When the parameters for interfacing the sequence program 2 installed in the sequential control section 20 and the numerical control section 10 are not set, the sequential control section 20 does not have an interface between the sequence program 2 and the numerical control section 10. Thus, the sequential control section 20 controls an independent peripheral device 43 according to the sequence program 2 installed in the sequential control section 20.

In the present invention, a plurality of sequence programs installed in the sequential control section can be assigned to the multiple control systems of the numerical control section, freely. Thus, the numerical control system can be changed or expanded easily, and a peripheral device can be added or chanced easily. Further, even when a peripheral device or the like is added to the system or changed, there is no need to provide a new programmable controller or the like. Thus, the numerical control system can be changed or expanded at a low cost. Further, sequence programs can be organized flexibly in accordance with to-be-controlled machines and peripheral devices.

What is claimed is:

1. A numerical controller comprising:
   a numerical control section numerically-controlling one or more systems;
   a sequential control section executing a plurality of sequence programs to independently input and output control signals for the one or more systems of said numerical control section;
   one or more interfaces, respectively connected to the one or more systems of said numerical control section, selectively interfacing said numerical control section and said sequential control section; and
   an assigning unit assigning the systems, to be controlled according to the sequence programs of said sequential control section, to said interfaces.

2. A numerical controller according to claim 1, wherein said numerical control section and said sequential control section perform sending and receiving of the control signals though said interfaces in accordance with the assigned systems.

3. A numerical controller according to claim 1, wherein information on the assignment of the systems to be controlled according to the sequence programs of said sequential control section is stored in nonvolatile storage means provided in said numerical control section.

4. A numerical controller according to claim 1, wherein said sequential control section controls a device not controlled by said numerical control section according to a sequence program to which none of the systems is assigned.

5. A method, comprising:
   numerically controlling one or more systems;
   executing a plurality of sequence programs to independenttly input and output control signals for controlling the one or more systems of a numerical control section;
   selectively interfacing the one or more systems of the numerical control section and a sequential control section; and
   assigning the systems to be controlled, according to the sequence program of the sequential control section, to said interfaces.

* * * * *

UNITED STATES PATENT AND TRADEMARK OFFICE
CERTIFICATE OF CORRECTION

PATENT NO. : 6,999,842 B2  Page 1 of 1
APPLICATION NO. : 10/745558
DATED : February 14, 2006
INVENTOR(S) : Noritake Nagashima et al.

It is certified that error appears in the above-identified patent and that said Letters Patent is hereby corrected as shown below:

Sheet 4 of 5, Block 20 (Box 2) (FIG. 6), Line 3, change "NC" to --NC)--
Column 2, Line 37, change "re" to --are--.
Column 6, Lines 47-48, change "independenttly" to -- independently --
Column 6, Line 55, change "program" to -- programs --

Signed and Sealed this

Eleventh Day of July, 2006

JON W. DUDAS
*Director of the United States Patent and Trademark Office*